(12) United States Patent
Chen

(10) Patent No.: US 7,437,970 B2
(45) Date of Patent: Oct. 21, 2008

(54) STAND TUBE OF A BICYCLE

(76) Inventor: Chao-Hu Chen, 5F.-2, No. 181, Sec. 2, Mei Tsun Rd., South District, Taichung City (TW)

( * ) Notice: Subject to any disclaimer, the term of this patent is extended or adjusted under 35 U.S.C. 154(b) by 445 days.

(21) Appl. No.: 11/352,278

(22) Filed: Feb. 13, 2006

(65) Prior Publication Data
US 2007/0202456 A1 Aug. 30, 2007

(51) Int. Cl.
B62K 21/12 (2006.01)
(52) U.S. Cl. ..................... 74/551.8
(58) Field of Classification Search ............... 74/551.1, 74/551.3, 551.8; 403/87, 103, 344, 385, 403/389, 391, 396; 280/88, 263, 264, 279; 188/24
See application file for complete search history.

(56) References Cited
U.S. PATENT DOCUMENTS 5,842,385 A * 12/1998 Su ............................ 74/551.3
6,035,741 A * 3/2000 Krizman, Jr. ............... 74/551.8
6,167,780 B1 * 1/2001 Chen .......................... 74/551.1
6,305,241 B1 * 10/2001 Masui et al. ................ 74/551.8
6,343,891 B1 * 2/2002 Combs ....................... 403/391
6,428,192 B1 * 8/2002 Chen .......................... 362/474
6,439,079 B1 * 8/2002 Kao ........................... 74/551.8
6,609,437 B2 * 8/2003 Jiang ......................... 74/551.1
6,874,385 B2 * 4/2005 Alley ......................... 74/551.1

* cited by examiner

Primary Examiner—Chong H Kim

(57) ABSTRACT

A stand tube of a bicycle comprises a body; one end of the body formed with a U shape ear; each leg of the U shape ear having a pivotal hole; a head having one end formed with a round portion; the round portion having a transversal penetrating hole; a buckling unit having a pivotal unit; a receiving hole penetrating through the buckling unit; the buckling unit passing through the two pivotal holes and the penetrating hole; two buckles; one surface of the buckle being protruded with a protrusion; and a screw unit received in the receiving hole of the pivotal unit; the teeth of two buckles being then engaged to the teeth portion of the U shape ear and the two protrusion being received into the pivotal hole. By above assembly, the stand tube of a bicycle has a rigid and firm structure.

5 Claims, 3 Drawing Sheets

STAND TUBE OF A BICYCLE

FIELD OF THE INVENTION

The present invention relates to bicycle parts, and in particular to a stand tube of a bicycle which has a rigid and firm structure.

BACKGROUND OF THE INVENTION

In the prior art stand tube of a bicycle, a front tube is connected to a stand tube. However in this prior art, the front tube is not adjustable to the stand tube in many different orientations.

In one prior art, the Taiwan Patent No. 570010, an improvement structure is disclosed.

In the prior art, a straight retainer and a transversal rod are used. One side of the straight retainer has a C shape mouth. A slit is formed in an opening of the mouth. A center of the mouth is hollowed. Two sides of the hollow portion are formed with angled holes. One end of the transversal rod has a slot for mounting the mouth. Two sides of the slot are wings. An outer end of the wing has a teeth surface for adhering a first block and a second block which have teeth rings. Each teeth ring has an angled end which can be inserted into the angled hole and then be clamped by the C shape mouth. Studs pass through the first and second blocks and the wings and elastic elements pass through the angled holes so that the first and second blocks tightly retains the teeth surfaces. By the angled holes and the angled ends, the transversal rod will not rotate and the gaps disappear.

Furthermore, in this stand tube, by the studs, the teeth rings of the first and second blocks and the teeth surfaces are tightly combined. Thereby positioning therebetween is adjustable effectively. When the stud is released, the blocks and the teeth surfaces will separate from one another. The transversal rod is movable and is adjustable along the angled ends.

However the prior art has the following disadvantages.

The straight retainer has a C shape mouth and a slit. Furthermore, the locking holes and angled holes are formed longitudinally and transversally. Thereby the straight retainer has a weak structure.

In assembly, in this stand tube, by the studs, the teeth rings of the first and second blocks and the teeth surfaces are tightly combined. Thereby positioning therebetween is adjustable effectively. However the shoulders of the first and second blocks resist against the penetrating hole and the angled ends are received into the angled holes of the straight retainer. The teeth rings are adhered to the tooth surfaces. The installation is not formed with a firm and rigid structure. If the structure is used for a long time, the angled ends will release, while the user is seldom to find this phenomenon and thus it will hurt the users.

Moreover if the screw cannot effectively lock the C shape mouth, the C shape cannot provide an effective pressing force and thus gaps generate. This will induce some dangerous conditions when the bicycle moves forwards. It is possible that the bicycle is out of control.

SUMMARY OF THE INVENTION

Accordingly, the primary object of the present invention is to provide a stand tube of a bicycle, wherein the round portion is received into the U shape ear. The pivotal unit serves to connect the round portion and the U shape ear so as to have a firm structure.

Furthermore, in the present invention, the trenches of the pivotal unit are engaged with the ribs of the round portion so as to form a further firm structure of the present invention to prevent the deformation of the structure.

Moreover in the present invention, the elastic unit is received the receiving hole. The pivotal unit is an axial center of the body. Then the buckles are installed at two ends of the U shape ear. Then the protrusion will engage to the recess. This is another firm structure of the present invention. The prior art C shape mouth is not used. Thereby the transversal through holes and longitudinal through holes are not used. The slits which are harmful to human body are also avoided.

To achieve above objects, the present invention provides The stand tube of a bicycle of present invention has the following elements.

A body is included. One end of the body is formed with a U shape ear having two legs. Each leg of the U shape ear has a pivotal hole. An outer side of each pivotal hole has a teeth portion. Another end of the stand tube is installed with a retaining portion.

A head has one end formed with a round portion. The round portion has a transversal penetrating hole. An inner wall of the penetrating hole is formed with a plurality of ribs.

A buckling unit has a pivotal unit. A receiving hole penetrates through the buckling unit. Each of two ends of the receiving hole is formed with a hexagonal recess. An outer periphery of the buckling unit is formed with a plurality of trenches. In assembly, the buckling unit passes through the two pivotal holes and the penetrating hole. The ribs of the round portion of the head are buckled to the trenches of the buckling unit.

Two buckles are included. One surface of the buckle is protruded with a hexagonal protrusion. A round area of the surface of the buckle around the protrusion is formed with teeth corresponding to the teeth portion of the U shape ear so that the teeth of the buckle is engageable to the teeth portion of the U shape ear.

An elastic unit encloses a screw unit and then the elastic unit and the screw unit are received in the receiving hole of the pivotal unit. The teeth of two buckles are then engaged to the teeth portion of the U shape ear and the two hexagonal protrusion are received into the pivotal holes.

The screw unit passes through the elastic units and the buckles so that the head is connected to the body. Another end of the screw unit is screwed to the buckles.

The various objects and advantages of the present invention will be more readily understood from the following detailed description when read in conjunction with the appended drawing.

DETAILED DESCRIPTION OF THE INVENTION

Figure 1:
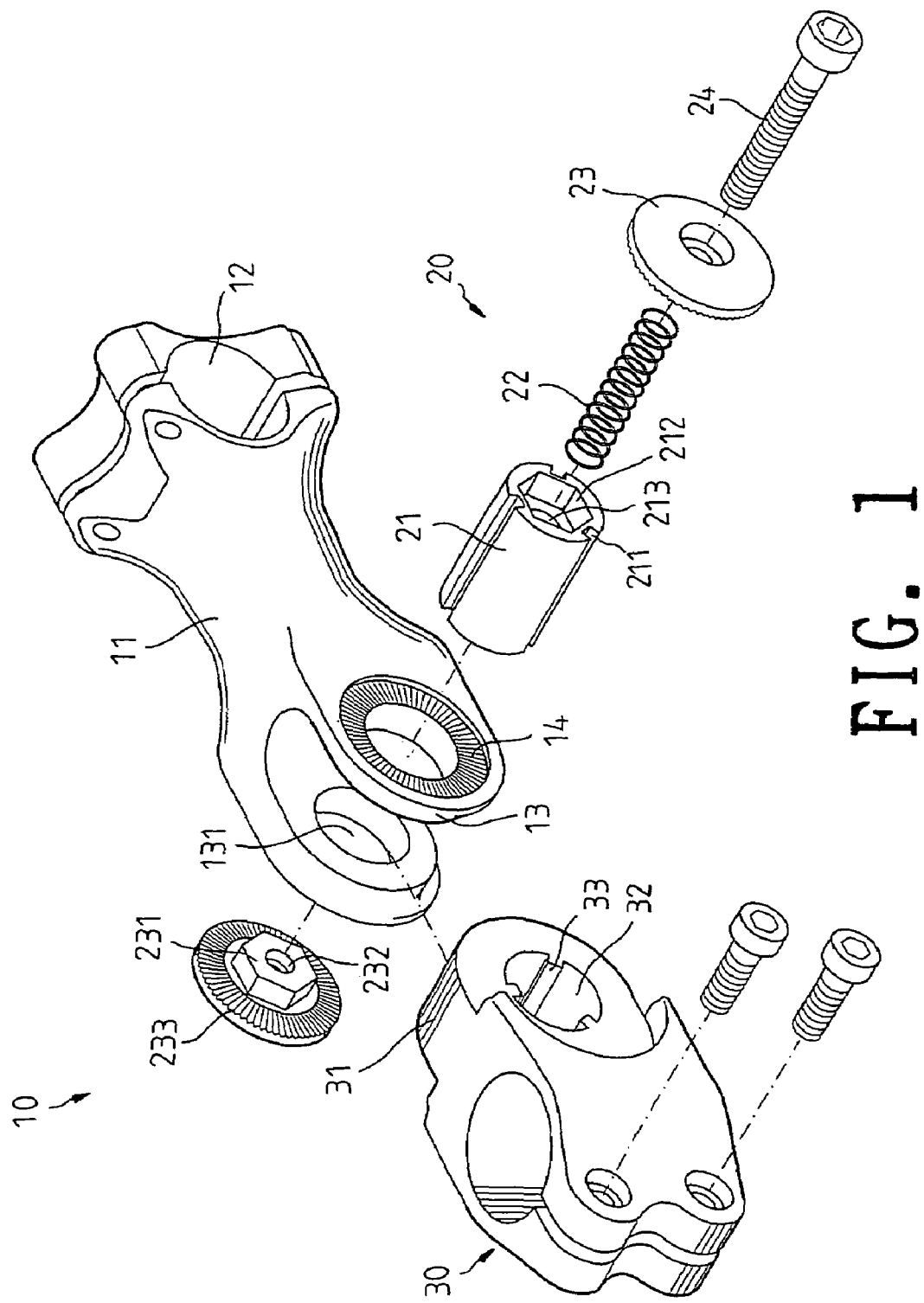
FIG. 1 is an exploded schematic view of the stand tube of a bicycle of the present invention.
Figure 2:
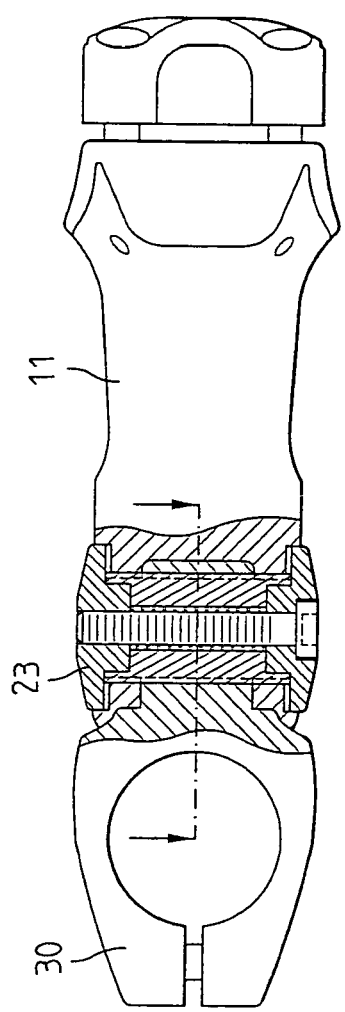
FIG. 2 is an upper cross sectional view of the stand tube of a bicycle of the present invention.
Figure 3:
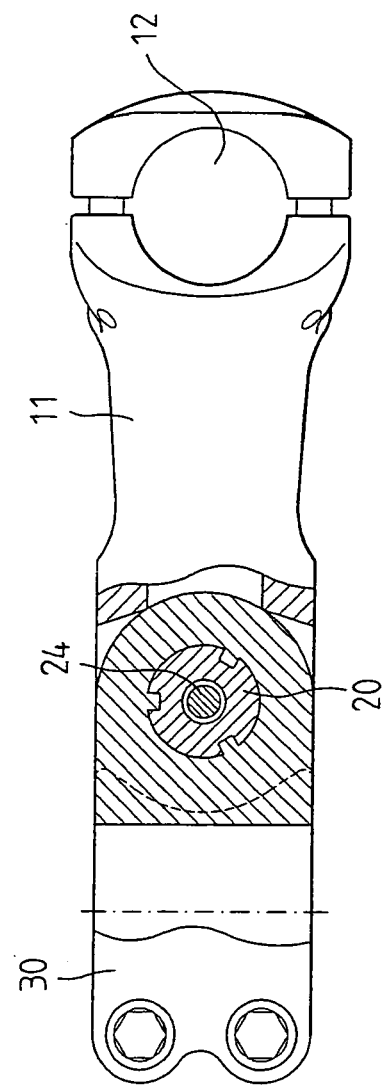
FIG. 3 is a structural cross sectional view of the stand tube of a bicycle of the present invention.
Figure 4:
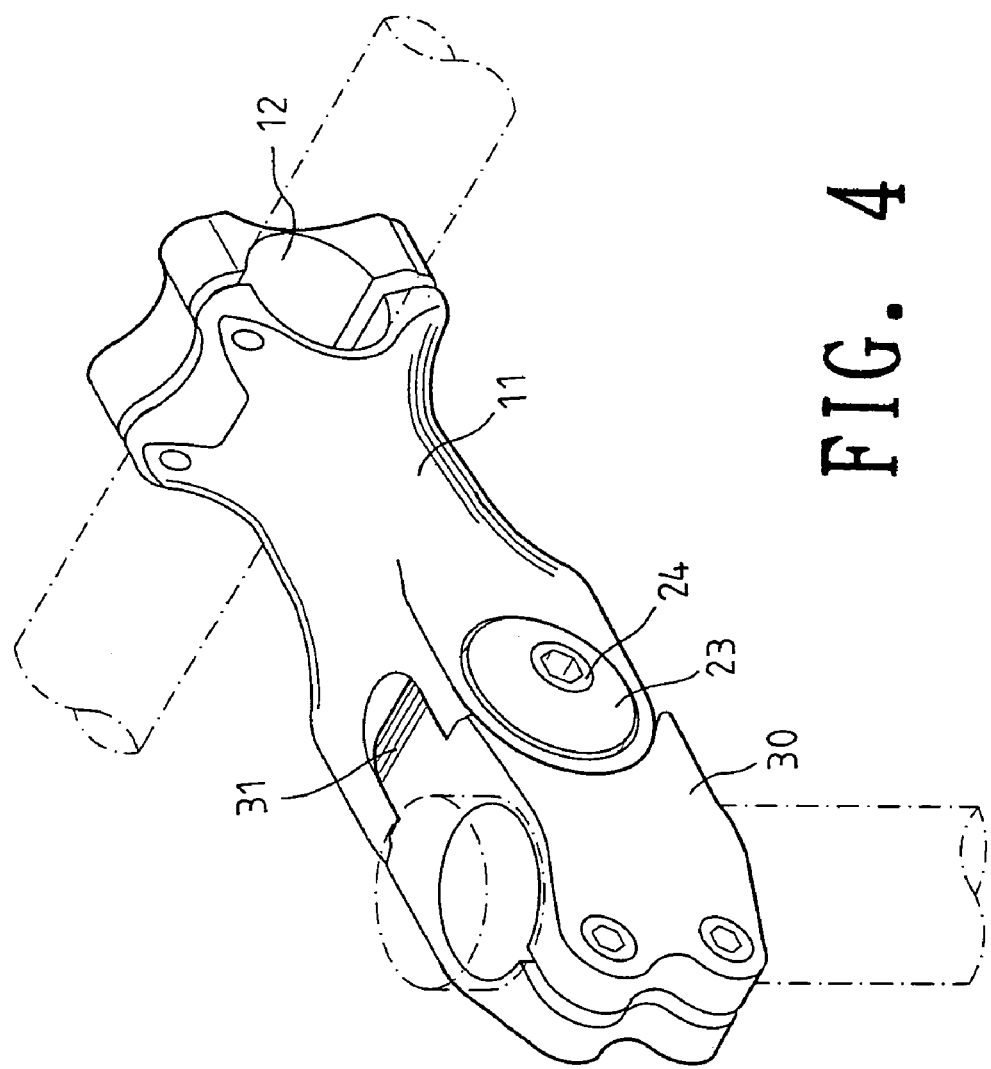
FIG. 4 shows the operation of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims. Referring to FIG. 1, the structure of the present invention is illustrated. The stand tube 10 of a bicycle of present invention has the following elements.

A body 11 is included. One end of the body 11 is formed with a U shape ear 13 having two legs. Each leg of the U shape ear 13 has a pivotal hole 131. An outer side of each pivotal hole 131 has a teeth portion 14. Another end of the stand tube 10 is installed with a retaining portion 12.

A head 30 has one end formed with a round portion 31. The round portion 31 has a transversal penetrating hole 32. An inner wall of the penetrating hole 32 is formed with a plurality of ribs 33.

A buckling unit 20 has a pivotal unit 21. A receiving hole 213 penetrates through the buckling unit 20. Each of two ends of the receiving hole 213 is formed with a hexagonal recess 212. An outer periphery of the buckling unit 20 is formed with a plurality of trenches 211. In assembly, the buckling unit 20 passes through the two pivotal holes 131 and the penetrating hole 32. The ribs 33 of the round portion 31 of the head 30 are buckled to the trenches 211 of the buckling unit 20.

Two buckles 23 are included. One surface of the buckle 23 is protruded with a hexagonal protrusion 231. A round area of the surface of the buckle 23 around the protrusion 231 is formed with teeth 233 corresponding to the teeth portion 14 of the U shape ear 13 so that the teeth 233 of the buckle 23 is engageable to the teeth portion 14 of the U shape ear 13.

An elastic unit 22 encloses a screw unit 24 and then the elastic unit 22 and the screw unit 24 are received in the receiving hole 213 of the pivotal unit 21. The teeth 231 of two buckles 23 are then engaged to the teeth portion 14 of the U shape ear 13 and the two hexagonal protrusion 231 are received into the pivotal holes 131.

The screw unit 24 passes through the elastic units 22 and the buckles 23 so that the head 30 is connected to the body 11. Another end of the screw unit 24 is screwed to the buckles 23.

In assembly, referring to FIGS. 2 to 5, round portion 31 is received into the U shape ear 13. The pivotal unit 21 serves to connect the round portion 31 and the U shape ear 13 so as to have a firm structure. When the trenches 211 of the pivotal unit 21 are engaged with the ribs 33 of the round portion 31 (this is a further firm structure of the present invention) so as to prevent the deformation of the structure. The elastic unit 22 is received the receiving hole 213. The pivotal unit 21 is an axial center of the body 11. Then the buckles 23 are installed at two ends of the U shape ear 13. Then the protrusion 231 will engage to the recess 212 (this is another firm structure of the present invention). The teeth portion 14 of the body 11 is engaged to the teeth 233 of the buckle 23.

Then the screw unit 24 passes through the buckles 23 and the elastic unit 22 so as to screw to the buckles 23. Thereby the buckles 23 are installed to the U shape ear 13. Thus a firm structure is formed. Further, screw unit 24 is installed into the elastic unit 22. The elastic unit 22 and the screw unit 24 are received into the receiving hole 213 of the pivotal unit 21. The trenches 211 of the pivotal unit 21 is engaged to the ribs 33. The teeth 233 of e buckle 23 is screwed to the teeth portion 14 of the U shape ear 13. Thus, it provides a rigid structure.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A stand tube of a bicycle comprising:
a body; one end of the body formed with a U shape ear having two legs; each leg of the U shape ear having a pivotal hole; an outer side of each pivotal hole having a teeth portion; another end of the stand tube installed with a retaining portion;
a head having one end formed with a round portion; the round portion having a transversal penetrating hole; an inner wall of the penetrating hole formed with a plurality of ribs;
a buckling unit having a pivotal unit; a receiving hole penetrating through the buckling unit; each of two ends of the receiving hole being formed with a recess; an outer periphery of the buckling unit being formed with a plurality of trenches; the buckling unit passing through the two pivotal holes and the penetrating hole; the ribs of the round portion of the head being buckled to the trenches;
two buckles; one surface of the buckle being protruded with a protrusion; a round area of the surface of the buckle around the protrusion being formed with teeth corresponding to the teeth portion of the U shape ear so that the teeth of the buckle being engageable to the teeth portion of the U shape ear;
a screw unit received in the receiving hole of the pivotal unit; the teeth of two buckles being then engaged to the teeth portion of the U shape ear and the two protrusion are received into the pivotal hole.

2. The stand tube of a bicycle as claimed in claim 1, wherein the recesses of the pivotal unit and the protrusions of the buckles have hexagonal shapes.

3. The stand tube of a bicycle as claimed in claim 1, wherein an elastic unit encloses a screw unit and then the elastic unit and the screw unit are received in the receiving hole of the pivotal unit.

4. The stand tube of a bicycle as claimed in claim 1, wherein there are three trenches in the pivotal unit.

5. The stand tube of a bicycle as claimed in claim 1, wherein there are three ribs on the round portion.

* * * * *